United States Patent [19]

Jacobs et al.

[11] 4,228,361
[45] Oct. 14, 1980

[54] WIND ELECTRIC PLANT WITH IMPROVED ALTERNATOR FIELD EXCITATION

[76] Inventors: Marcellus L. Jacobs; Paul R. Jacobs, both of Rte. 13 - Box 722, Ft. Myers, Fla. 33908

[21] Appl. No.: 887,373

[22] Filed: Mar. 16, 1978

[51] Int. Cl.³ .............................................. H02P 9/04
[52] U.S. Cl. ...................................... 290/44; 290/55; 322/28; 322/35
[58] Field of Search ................. 290/43, 44, 54, 55; 322/28, 35; 219/279

[56] References Cited

U.S. PATENT DOCUMENTS

| | | | |
|---|---|---|---|
| 1,257,801 | 2/1918 | Burke | 219/279 |
| 2,579,311 | 12/1951 | Fairey | 290/55 |
| 3,389,326 | 6/1968 | Hyvarinen | 322/28 |
| 3,401,328 | 9/1968 | Hartung | 322/28 |
| 3,474,323 | 10/1969 | Kilgore et al. | 322/28 |
| 3,539,906 | 11/1970 | Haböck | 322/28 |
| 4,047,095 | 9/1977 | Wijnterp | 322/28 |
| 4,059,771 | 11/1977 | Jacobs et al. | 290/44 |

*Primary Examiner*—B. Dobeck
*Attorney, Agent, or Firm*—Shoemaker and Mattare, Ltd.

[57] ABSTRACT

An improvement in a wind electric power plant of the type disclosed in U.S. Pat. No. 4,059,771. The improvement comprises including an exciter armature and an associated exciter field winding into the electric circuit disclosed in U.S. Pat. No. 4,059,771. The improved wind electric power plant is utilized to supply A.C. power to hot water heater loads and/or auxiliary loads such as air conditioners, devices to manufacture hydrogen gas and the like, wherein at least one of said auxiliary loads is solar-powered. Associated circuitry is provided so that power can be supplied alternatively to either the hot water heater loads or to the auxiliary loads. The power supplied via the associated circuitry supplements power to the at least one solar-powered auxiliary load, thereby maintaining a full load on the electric power plant to insure the quiet operation of that plant.

18 Claims, 4 Drawing Figures

EXCITER ALTERNATOR CONTROL SYSTEM
FIELD CURRENT SUPPLIED BY CONSTANT VOLTAGE BATTERY

OPERATIONAL TABLE FOR POSITION A

| FUNCTION | CONTROL STATE | THERMO-STAT | THYRISTOR CONTROL RELAY | S₁ | THYRISTOR CONTROL STATE TH₁, TH₂, TH₃, | TH₄, TH₅, TH₆ |
|---|---|---|---|---|---|---|
| HOT WATER HEATER LOADS | ON | CLOSED | ENERGIZED | | ON | OFF |
| | OFF | OPEN | DE-ENERGIZED | | OFF | ON |
| AUXILIARY LOADS | ON | OPEN | DE-ENERGIZED | | OFF | ON |
| | OFF | CLOSED | ENERGIZED | | ON | OFF |

OPERATIONAL TABLE FOR POSITION B

| FUNCTION | CONTROL STATE | THERMO-STAT | THYRISTOR CONTROL RELAY | $S_1$ | THYRISTOR CONTROL STATE $TH_1, TH_2, TH_3$ | $TH_4, TH_5, TH_6$ | EXCITER FIELD CKT. |
|---|---|---|---|---|---|---|---|
| HOT WATER HEATER LOADS | ON | CLOSED | ENERGIZED | → | ON | — | CLOSED / ALT ON |
|  | OFF | OPEN | ENERGIZED | → | OFF | — | OPEN / ALT OFF |

4,228,361

WIND ELECTRIC PLANT WITH IMPROVED ALTERNATOR FIELD EXCITATION

BACKGROUND OF THE INVENTION

The present invention relates, in general, to wind electric plants, and more particularly, to a wind electric plant of the type which includes a wind driven propeller or the like to drive an alternator for producing electrical energy.

U.S. Pat. No. 4,059,771 issued to Jacobs, et al. discloses a battery controlled variable speed alternator for wind electric operation. The present invention is an improvement of the just-mentioned Jacobs, et al. patent, and the disclosure thereof is fully incorporated herein by reference thereto.

In the referenced Jacobs, et al. patent, alternator output is controlled directly through controls responsive to alternator speed and battery voltage to provide a relatively constant excitation current for the field winding of the alternator from a storage battery, whereby the alternator field is fully excited at substantially all speeds of operation thereof. In the present improvement, alternator output is controlled through the field control of an exciter, such control enabling the alternator field to be fully energized even at slow speeds. Additionally, such control permits a fully energized degree of field saturation over the entire speed range.

The inventors have found that the field of wind electric plants has need of means for energizing the field of a slow moving alternator so that the alternator can develop full voltage at slow speed while also permitting speed increases or two or three times the starting speed. Such means should also permit full control of the energy output of the overall device. The presently disclosed device satisfies this need.

SUMMARY OF THE INVENTION

The present invention is an improvement in a wind electric power plant of the type disclosed in U.S. Pat. No. 4,059,771. The improvement comprises including an exciter armature and its associated exciter field winding into the electric circuitry disclosed in the referenced patent wherein battery current is utilized to provide the excitation current for the exciter field winding which thereby, through the exciter armature, controls the excitation of the alternator field winding. Thus, only a small voltage battery, i.e. 12 V, 24 V or any voltage up to 120 V, for field excitation is required.

The improvement further comprises additional circuitry whereby the A.C. output of the alternator is utilized to energize output loads, such as hot water heater loads contained in a heat storage unit, or the like, or, alternatively, to supply A.C. power to auxiliary loads such as air conditioners, devices to manufacture hydrogen gas, or the like, with at least one of these devices being adapted to be solar powered. The A.C. power output of the alternator is automatically diverted to the auxiliary loads when the heat storage unit is at, or above, the desired temperature to either energize the load or to supply supplemental power to those auxiliary loads that are solar powered. A constant load on the wind electric power plant is thus maintained to insure the quiet operation of the plant even at times of strong wind conditions.

The improvement embodying the teachings of the present invention further provides circuit means, included in the additional circuitry, to solely operate hot water heater loads contained in the heat storage unit or like device. Thermostatic switch means, associated with the heat storage unit and included in the circuit means, is connected into the exciter field winding circuit. The thermostatic switch disconnects, i.e. opens, the exciter field winding circuit thereby disconnecting the field drain on the storage battery when the heat storage unit is at or above the desired temperature. Thus, the thermostatic switch insures that periods of inaction of the exciter field winding circuit do not cause discharge of the storage battery.

OBJECTS OF THE INVENTION

It is an object of the present invention to use battery current for field control in the device disclosed in Jacobs, et al. U.S. Pat. No. 4,059,771.

It is another object of the present invention to permit an alternator to be used on a machine with a wide range of speed and for either direct A.C. output or for battery charging or any combination of the two.

It is still another object of the present invention to energize the field of a slow moving alternator so it can develop full voltage at slow speed and also permit speed increases of two or three times the starting speed with full control of the energy output to meet all requirements.

It is a further object of the present invention to use battery current to provide the excitation current for the exciter field winding which, through the exciter armature, controls the excitation of the alternator field winding.

It is yet a further object of the present invention to insure quiet operation of a wind electric power plant even at times of strong wind conditions.

It is a specific object of the present invention to automatically divert A.C. power output of an alternator from a heat storage unit to auxiliary loads, at least one of which is solar powered, thereby supplying supplemental power to the auxiliary loads when the heat storage unit is at or above a desired temperature.

It is another specific object of the present invention to provide for sole operation of a hot water heater load contained in a heat storage unit or a like device.

It is still another specific object of the present invention to disconnect a field drain on a storage battery for insuring that periods of inaction of an exciter field winding circuit do not discharge the storage battery.

DETAILED DESCRIPTION OF THE INVENTION

Figure 1A:
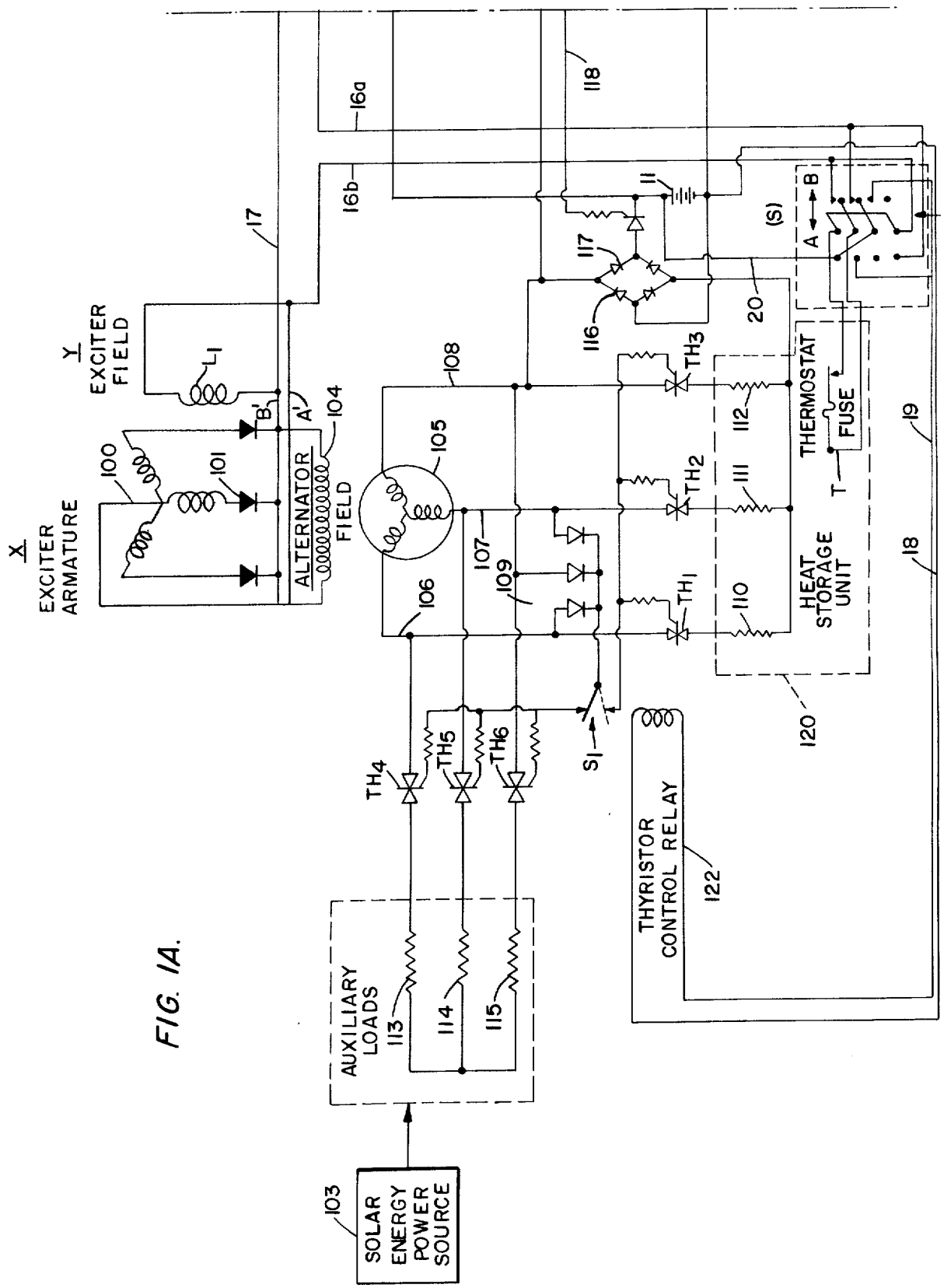
FIG. 1 shows a schematic view of a circuit for an alternator arrangement embodying the teachings of the present invention.
Figure 1B:
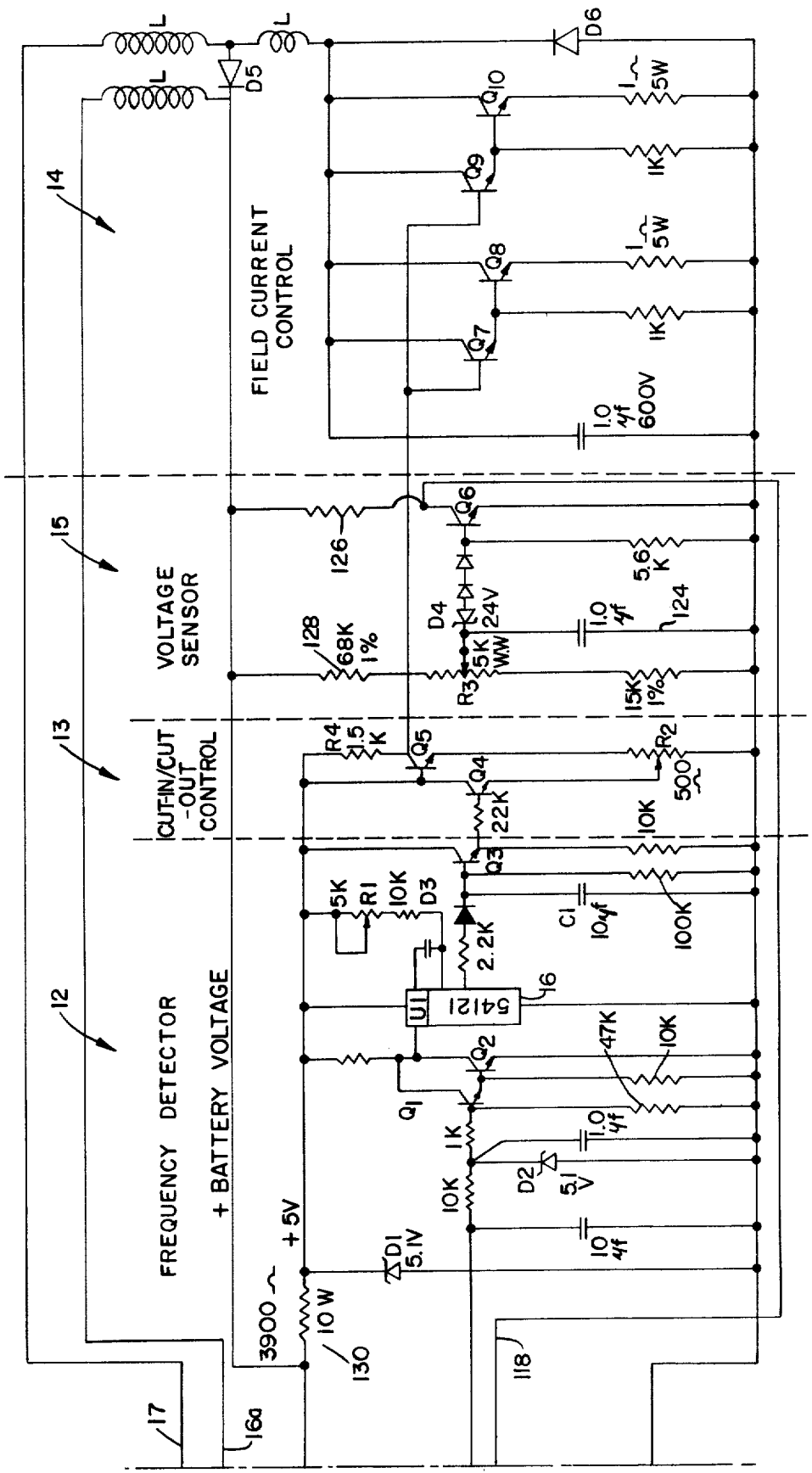

With reference to FIG. 1, it is seen that an exciter including an exciter armature X and an exciter field winding Y associated therewith have been added to the circuit disclosed in FIG. 3 of the referenced Jacobs, et al. patent.

As shown in FIG. 1, exciter field circuit Y includes an exciter winding $L_1$, connected in series with inductors L of the field control circuit, and the exciter armature X includes a wye-connected transformer 100 having single diode means 101 in each leg thereof and an alternator field winding 104 connected to the output thereof.

In the present invention, the exciter field is controlled as in the Jacobs, et al. circuit for direct alternator field control. The exciter field in turn passes on this control from the battery 11 to the alternator field winding 104 through the associated exciter armature. The alternator field winding is connected to the output of the exciter armature which supplies a D.C. excitation current to the alternator field winding through the three-phase rectifier network 102.

Because of the use of an exciter, only a small battery of, for example, 12 or 24 volts, up to, for example, 120 volts, is required for alternator field excitation while utilizing the A.C. output of the alternator for power energization or other output loads. Such other loads are indicated in FIG. 1 by the reference numerals 110, 111 and 112, i.e., hot water heater loads, and auxiliary loads 113, 114 and 115, i.e., air conditioner loads, devices to manufacture hydrogen gas, or the like. At least one of the auxiliary loads is solar powered. As shown in FIG. 1, a solar energy power source is utilized to convert solar energy to electrical energy of the type needed to energize and/or supply power to any of the auxiliary loads 113-115. Such electrical energy can be A.C. energy. Supplemental power is supplied to the solar powered auxiliary loads through associated circuitry which is described hereinafter.

Thermostat controls from any water heating or other output loads can be inserted into the field circuit of the alternator to reduce the output thereof, independent of the voltage applied to the small field control battery. Any reduction of the A.C. power load on the alternator will give a voltage raise to the control terminals and result in a reduction of power output.

As shown in FIG. 1, the alternator three-phase A.C. output transformer 105 includes output phase legs 106, 107 and 108 which are connected to auxiliary loads 113, 114 and 115 through respective thyristor means $TH_4$, $TH_5$ and $TH_6$. Hot water heater loads 110, 111 and 112, contained in the heat storage unit 120 or like device, are also connected to the output phase legs 106, 107 and 108 through respective thyristor means $TH_1$, $TH_2$ and $TH_3$. The thyristor means utilized in the present circuitry may be conventional TRIAC devices, the operation of which is well known. Diode rectifier means 109 is connected between the output phase legs of the alternator output transformer 105 and the gate electrodes of the thyristor means $TH_1$-$TH_3$ and $TH_4$-$TH_6$ through switch means $S_1$ associated with and actuated by the thyristor control relay 122. Diode rectifier means 109 functions to develop an appropriate D.C. signal which is applied to the gate electrodes of the thyristor means to energize the same. More specifically, the anodes of each of the three single diodes included in rectifier diode means 109 are respectively connected to output phase legs 106, 107 and 108. The cathodes of each of these diodes are connected to a common output line connected to switch means $S_1$.

With switch means $S_1$ in the "up" position, as shown, an appropriate gate signal is applied to the gate electrodes of thyristors $TH_4$, $TH_5$ and $TH_6$ thereby energizing these thyristors and supplying A.C. power to respective auxiliary loads 113, 114 and 115. When switch $S_1$ is in the "down" position, an appropriate gate signal is applied to the gate electrodes of thyristors $TH_1$, $TH_2$ and $TH_3$ thereby energizing these thyristors and supplying A.C. power to hot water heater loads 110, 111 and 112.

The relative position of switch $S_1$ is controlled by thyristor control relay 122 which, when energized, causes $S_1$ to be actuated to the "down" position. Conversely, when thyristor control relay 122 is de-energized, switch $S_1$ returns to the "up" position. The circuit means controlling the operation of the thyristor control relay is described hereinafter.

Referring to FIG. 1, bridge rectifier means 116 is connected between output phase leg 108 and the positive side of the field storage battery 11, and serves to produce D.C. charging current for the field storage battery. The bridge rectifier means 116 functions to convert the A.C. present on phase leg 108 to D.C. which is supplied to the field storage battery 11 through a control SCR 117. As shown, the anode of SCR 117 is connected to the output of the bridge rectifier means 116 and the cathode of SCR 117 is connected to the positive side of the field storage battery. Bridge rectifier means 116 is further connected, as shown, to the circuitry of the herein referenced Jacobs, et al. patent and to the output side of hot water heater loads 110, 111 and 112.

When the exciter field winding circuit is connected and when the circuitry of the herein referenced Jacobs, et al. patent is operational, an appropriate gate signal is obtained from the collector of $Q_6$ and applied through line 118 to the gate electrode of SCR 117 to energize SCR 117 to provide D.C. charging current to field storage battery 11. Conversely, SCR 117 does not conduct when the exciter field winding circuit is disconnected.

Figure 2A:
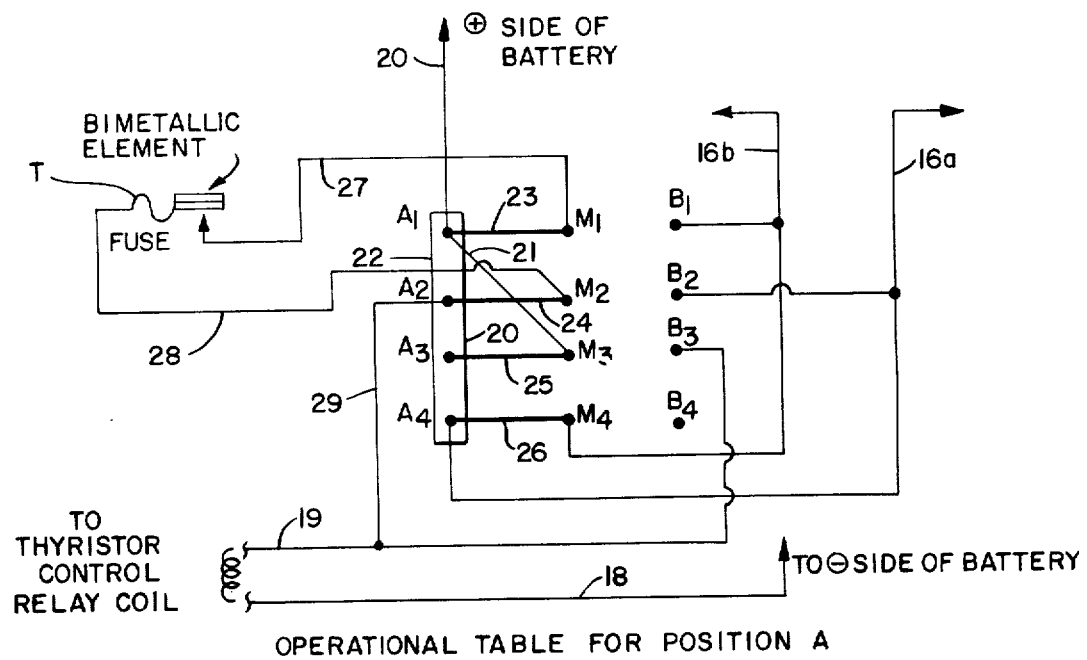
FIGS. 2A and 2B show a schematic view of the four pole double throw switch positions "A" and "B", respectively, along with operational tables therefor.
Figure 2B:
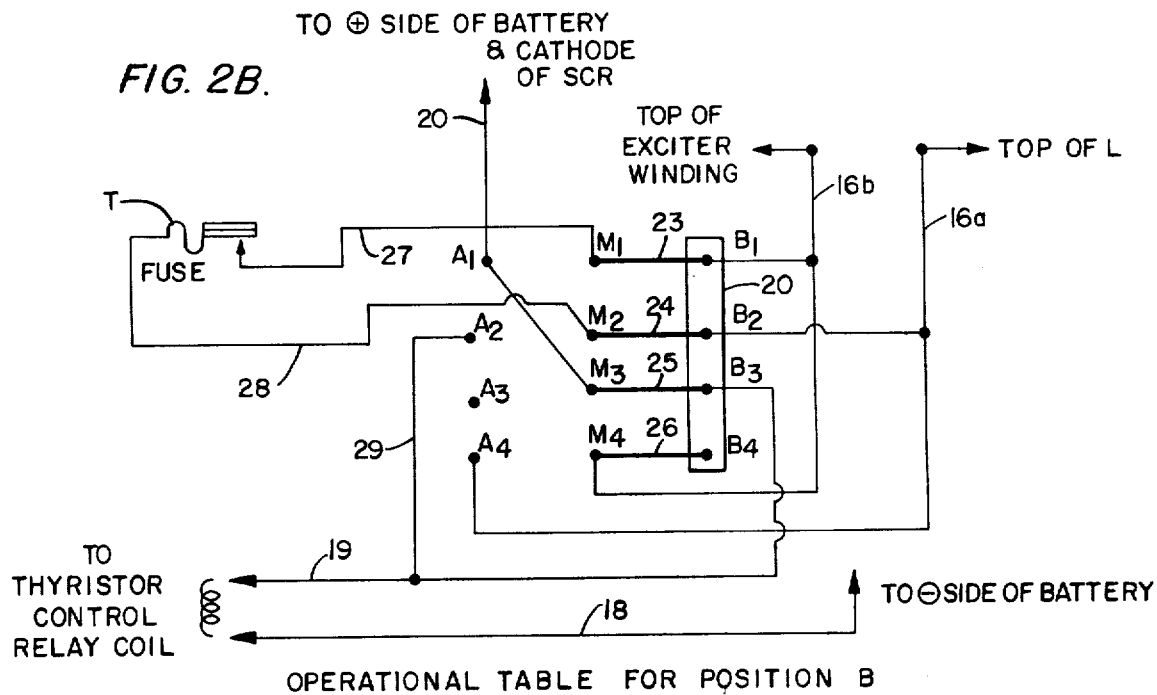

As shown in FIG. 1, a four pole-double throw switch S interconnects a thermostat T associated with the heat storage unit, thyristor control relay 122, the field storage battery 11 and lines 16a and 16b of the exciter field winding circuit. The four pole-double throw switch S is manually operable to two distinct positions, namely, "A" or "B" as indicated in FIG. 1. Position "A" is utilized to permit use of the device as an A.C. power source for the hot water heater loads 110, 111 and 112 and, alternatively, for the auxiliary loads 113, 114 and 115, at least one of which is solar powered. Position "B" is utilized to permit use of the device as an A.C. power source for the sole operation of the hot water heater loads. The internal connections of switch S and the corresponding connections of same to the associated circuitry for positions "A" and "B" are shown in FIGS. 2A and 2B, respectively.

The four pole-double throw switch S comprises fixed contacts $A_1$-$A_4$, $M_1$-$M_4$ and $B_1$-$B_4$; an internal jumper wire 21 connecting fixed contacts $A_1$ and $M_3$; and an insulated bar means 22 which has connected thereto blade members 23, 24, 25 and 26.

When switch S is placed in the "A" position, internal connections between fixed contacts $A_1$ and $M_1$, $A_2$ and $M_2$, $A_3$ and $M_3$, $A_4$ and $M_4$ are made through the respective interconnecting blade members 23, 24, 25 and 26. The connections of exciter field winding lines 16a and 16b is made by contacts $A_4$ and $M_4$ through blade member 26. As shown in FIG. 2A, thermostat T (in its "closed" position) is thereby connected to the associated circuitry of the device by the following: line 20 (positive side of field storage battery 11), contacts $A_1$ and $M_1$, through blade member 23, line 27, the thermostat, line 28, contacts $M_2$ and $A_2$ through blade member 24, line 29, line 19 to the thyristor control relay 122, and from relay 122 through line 18 back to the negative side of field storage battery 11.

As stated above, thermostat T is associated with the heat storage unit 120 thereby sensing the temperature thereof and operating accordingly. When the heat storage unit or the like is at or above the desired temperature, the bimetallic member of the thermostat "opens" the circuit from line 20 (positive side of field battery 11) to the thyristor control relay 122 thereby de-energizing the same which causes switch $S_1$ to be actuated to the "up" position as shown in FIG. 1. This action of the thermostat causes A.C. power to be supplied to the auxiliary loads to either energize the same or to supply supplemental A.C. power to those auxiliary loads that are solar powered. This application of A.C. power from the alternator $3\phi$ A.C. output transformer 105 is accomplished through the previously-described circuitry which includes diode rectifier means 109 and thyristors $TH_4$, $TH_5$ and $TH_6$.

Conversely, when the temperature of the heat storage unit 120 falls below the desired temperature, the bimetallic element of thermostat "closes" the circuit from line 20 (positive side of field battery 11) to the thyristor control relay 122 thereby energizing the same which causes switch $S_1$ to be actuated to the "down" position. This action of the thermostat causes A.C. power to be diverted from the auxiliary loads and supplied to the hot water heater loads or the like 110, 111 and 112 accomplished through the previously described circuitry which includes diode rectifier means 109 and thyristors $TH_1$, $TH_2$ and $TH_3$.

The before-mentioned operation of the present device and associated circuitry is illustrated in the table of FIG. 2A.

As shown in FIG. 2B, when the switch S is placed in the "B" position to facilitate sole operation of the hot water heater loads, internal connections between fixed contacts $B_1$ and $M_1$, $B_2$ and $M_2$, $B_3$ and $M_3$, and $B_4$ and $M_4$ are made through the respective interconnecting blade members 23, 24, 25 and 26. Accordingly, the thermostat T is connected in series into the exciter field winding circuit lines 16a and 16b thereby allowing the action of the thermostat, through the bimetallic element thereof, to control the connection or disconnection of the exciter field winding circuit which thereby controls the operation of the alternator.

As shown in FIG. 2B, the thyristor control relay 122 is connected into the circuit by the following: line 20 (positive side of field battery 11), fixed contacts $A_1$ and $M_3$ through internal jumper wire 21, $M_3$ and $B_3$ through blade member 25, line 19, thyristor control relay 122, and back to the negative side of the field battery 11 through line 18. Accordingly, when the heat storage unit 120 is at or above the desired temperature, the bimetallic member of thermostat T acts to "open" the exciter field winding circuit which de-energizes the alternator. De-energizing the field winding causes a cessation of A.C. power at the output transformer 105 thereof, and respective phase legs 106, 107 and 108. Thus, no gate signal can be produced by the diode rectifier means 109 for thyristors $TH_1$, $TH_2$ and $TH_3$. Therefore, with no gate signal available for the gate electrodes of thyristors $TH_1$, $TH_2$ and $TH_3$, these thyristors are de-energized thereby disconnecting the A.C. power inputs to the respective hot water heater loads. Furthermore, this "opening" action of the thermostat T to disconnect lines 16a and 16b of the exciter field winding circuit results in also disconnecting the field drain on the battery 11 so that such periods of inaction in the exciter field winding circuit do not tend to discharge battery 11.

Conversely, when the heat storage unit 120 is below the desired temperature, the bimetallic element of the thermostat "closes" thereby connecting the exciter field winding circuit causing the alternator to be energized to produce A.C. power at the output transformer 105 thereof. Diode rectifier means 109 accordingly produces the appropriate gate signal to energize thyristors $TH_1$, $TH_2$ and $TH_3$, which gate signal is applied to their respective gate electrodes through switch $S_1$, "down" position (thyristor control relay 122 in energized state of operation). Thus, A.C. power is supplied to the hot water heater loads 110, 111 and 112.

The before-mentioned operation of the present device and associated circuitry is illustrated in the table of FIG. 2B.

It is noted that the ability of the device of the present invention to maintain full electric load on the alternator, as described above with reference to position "A", is an important advantage thereof. Maintenance of full electric load uses essentially all of the available energy produced by the wind power unit associated with the device of the present invention, and a full load is maintained on the propellers of such wind power unit. Such full loading produces quiet operation during all wind conditions.

Heretofore, when an alternator load is removed in a strong wind condition the unloaded propellers may be quite noisy due to the pitch change condition of the propellers and such noise may be objectionable in certain locations, such as near populated areas, or the like. The propellers of a unit using the device of the present invention remain fully loaded and thus operate quietly under all wind conditions.

The field of the alternator operates under full excitation when the switch S is in the "A" position. When the system is operating to solely heat water by thermostatic control with the switch S in the "B" position, the intermittent action of the thermostat in disconnecting the field circuit at intervals also serves to disconnect the field drain on the battery 11 so that such periods of inaction in the field circuit therefore do not tend to discharge the battery. Using the device of the present invention, the field watt drain on battery 11 is in the range of 100 to 200 watts, and due to the small field watt load on the battery, full charge on that battery will be maintained for long periods of time.

The control system herein disclosed is ideal for use with a wind energy unit which is combined with a solar powered heating system. The two energy conversion systems can be combined to very efficiently produce energy because the wind energy conversion unit will generally deliver greater output during cloudy days or at night when the solar energy conversion unit is relatively inactive. In such periods, there is generally sufficient wind to offset the reduced solar energy output. The present device is thus ideally suited for use with even those homes connected to a community power system.

Any size field battery may be used, such as from a 12 volt to a 120 volt battery, or other suitable battery systems. The device of the present invention can thus be integrated into a complete home electric power system. The alternator field will be designed to fit the battery system used.

In operation of the wind electric plant as a water heater for home heating, domestic water needs, air conditioning, or the like, no storage battery system will be used except that needed to give the field control a constant voltage source to secure full field saturation at low wind, slow speed operation. Thus, the field control battery can be quite small and inexpensive. All of the features disclosed in the referenced Jacobs, et al. patent, such as supplying the full field current at the proper "cut-in" speed when the wind is strong enough to start producing current, disconnecting the battery from the field circuit when the plant slows down below generating speed, and the like are retained, while additionally reducing the cost of the batteries required to operate the system.

It is apparent that the device of the present invention uses battery current for controlling the excitation current for the alternator field winding. This is accomplished by providing the battery current to the exciter field winding which is, in essence, its excitation current. The exciter field winding has associated therewith an exciter armature which thereby provides the excitation current for the alternator field winding connected to its output.

The presently disclosed system can also be used, with the exciter connected into the circuit, when the alternator is being used primarily for battery charging. Thus, no change in the alternator construction need be effected whether that alternator is used to supply energy from the alternating current output thereof, or being used primarily as a battery charging system.

Accordingly, several uses can be made of the device. For example, direct A.C. energy can be generated for heating water or other such uses. The separate uses disclosed herein are merely for the sake of convenience, and are not intended to be limiting. Thus, combinations of the two systems can be effected without departing from the scope of the present invention.

It is also noted that use of the exciter in the present device permits the construction of a three-phase brushless alternator without any contact brushes, such as are generally required to directly control the field of the alternator. This results when an alternator rotor and the rotor of the exciter are mounted on the same rotatably driven shaft so that the exciter can deliver the necessary field current directly to the alternator. The exciter field control is stationary, and as such, can be connected to the battery control circuit by direct wires, thereby eliminating any collector rings or brushes in the alternator frame.

The presently disclosed battery controlled system of voltage and electric power generation permits an alternator to be used on a machine having a wide range of speed and adaptable for either direct A.C. output or for battery charging, or for any combination thereof.

The specific resistor, capacitor, diode, and the like values indicated on the schematic diagram of FIG. 1 are examples of one operative embodiment only, and these values could change depending upon the particular application of the circuit. Furthermore, the value of certain resistive and capacitive components depends upon the nominal field battery voltage and can be changed accordingly. It is noted that capacitor 124 in the voltage sensor circuit 15 along with the resistors 126 and 128 in that circuit and resistor 130 in the frequency detector circuit 12 have a value selected according to the nominal field battery voltage.

Furthermore, it may also be necessary to slightly alter the circuitry to enhance the operability of the present device in accordance with specific applications thereof without departing from the spirit or essential character of the same. For example, resistor R126 has been added to the circuitry of the herein referenced Jacobs, et al. patent to enhance the operability of the present device by, i.e., assisting in the development of an appropriate gate signal for SCR 117, and the like.

As this invention may be embodied in several forms without departing from the spirit or essential characteristics thereof, the present embodiment is, therefore, illustrative and not restrictive, since the scope of the invention is defined by the appended claims rather than by the description preceding them, and all changes that fall within the metes and bounds of the claims or that form their functional as well as conjointly cooperative equivalents are, therefore, intended to be embraced by those claims.

We claim:

1. In a wind electric plant of the type including a wind driven propeller or the like supported at the top of a tower and connected to drive an alternator supported on the tower to generate electrical energy, and storage battery means connected to be charged by the alternator, electrical control circuit means connecting the storage battery means with the field winding of the alternator to supply a substantially constant current to the field winding at substantially all speeds of operation of the wind electric plant within a predetermined range of speeds to excite the field of the alternator and thus obtain full excitation of the alternator field at substantially all speeds of operation of the wind electric plant within said range, the improvement comprising: exciter means connected with said electrical control circuit means connecting the storage battery means with said field winding of the alternator, wherein the substantially constant current supplied to said field winding of the alternator is supplied via said exciter means so that the alternator field can be fully energized at slow speed and have such field saturation condition maintained over the entire speed range of said alternator.

2. The improvement defined in claim 1 further including means connected to the electrical control circuit means for charging said storage battery means.

3. The improvement defined in claim 2 further including load means requiring A.C. energy connected to the A.C. output circuit of said alternator.

4. The improvement defined in claim 3 wherein said load means requiring A.C. energy includes a first load means which includes a water heating means.

5. The improvement defined in claim 4 wherein said load means further includes second, auxiliary load means.

6. The improvement defined in claim 5 wherein said second, auxiliary load means includes a hydrogen gas manufacturing device.

7. The improvement defined in claim 5 wherein said second, auxiliary load means includes an air conditioning device.

8. The improvement defined in claim 1 wherein the utilization of said exciter means thereby allows the use of an inexpensive storage battery means having a voltage value of from 12 volts up to and including 120 volts.

9. The improvement defined in claim 1 wherein the utilization of said exciter means permits the use of a three-phase brushless alternator which does not require any collector rings or contact brushes.

10. The improvement defined in claim 9 wherein the rotor of said exciter means and the rotor of said three-phase brushless alternator are mounted on a common rotatably driven shaft, said exciter means having its stationary field winding directly connected to said electrical control circuit means.

11. The improvement defined in claim 5 including circuit means operable to selectively supply A.C. power to said first load means and said second, auxiliary load means.

12. The improvement defined in claim 11 wherein said circuit means includes means to automatically divert the supply of A.C. power from said first load means to said second, auxiliary means thereby maintaining a constant load on the wide electric plant to thereby insure quiet operation of said wind electric plant even at times of strong wind conditions.

13. The improvement defined in claim 12 wherein said means included in said circuit means automatically diverts the supply of A.C. power from said second, auxiliary means to said first load means.

14. The improvement defined in claim 4 including circuit means operable to supply A.C. power to said first load means, said circuit means including thermostatic switch means, associated with said water heating means, being connected into the field winding circuit of said exciter means, wherein said thermostatic switch means operates upon opening to disconnect the said field winding circuit of said exciter means to thereby disconnect the field drain on said storage battery means.

15. The improvement defined in claim 13 wherein said means included in said circuit means includes thermostatic switch means associated with said first load means, wherein said means to automatically divert the supply of A.C. power to and from said first load means and said second, auxiliary load means operates in accordance with the actuation of said thermostatic switch means.

16. The improvement defined in claim 15 wherein said circuit means further includes manually actuated switch means connected in circuit therein and operable to two distinct switch positions, whereby one switch position allows the said circuit means to selectively supply A.C. power to and from each of said first load means and said second, auxiliary load means, and the other switch position allows the circuit means to solely supply A.C. power to said first load means.

17. The improvement defined in claim 13 or claim 16 wherein said means included in said circuit means includes electronic switch means operable therethrough to selectively supply A.C. power to each of said first load means and second, auxiliary load means.

18. The improvement defined in claim 17 wherein said electronic switch means comprises a plurality of TRIAC devices.

* * * * *